United States Patent [19]

Patton et al.

[11] Patent Number: 6,078,758
[45] Date of Patent: Jun. 20, 2000

[54] PRINTING AND DECODING 3-D SOUND DATA THAT HAS BEEN OPTICALLY RECORDED ONTO THE FILM AT THE TIME THE IMAGE IS CAPTURED

[75] Inventors: David L. Patton, Webster; Stephen J. Rowan, Spencerport; Cynthia S. Bell, Webster, all of N.Y.

[73] Assignee: Eastman Kodak Company, Rochester, N.Y.

[21] Appl. No.: 09/030,984

[22] Filed: Feb. 26, 1998

[51] Int. Cl.[7] .................................................. G03B 17/24
[52] U.S. Cl. ............................................ 396/312; 396/429
[58] Field of Search ..................................... 396/310, 311, 396/312, 315, 429

[56] References Cited

U.S. PATENT DOCUMENTS 5,128,700  7/1992  Inoue et al. .
5,276,472  1/1994  Bell et al. .
5,363,157  11/1994  Cocca .
5,363,158  11/1994  Stoneham .

*Primary Examiner*—David M. Gray
*Attorney, Agent, or Firm*—Derrick W. Reed; Francis H. Boos, Jr.

[57] ABSTRACT

An image and an associated audio segment are recorded on a film negative. The information on the film negative can be printed as encoded sound data on photographic paper or the like. For displaying, the sound data is scanned, decoded to create an audio segment data stream, and the data stream is played, typically by a computer while a monitor displays the image at the same time. More realistic sound playback is achieved by recording audio segments with plural microphones and playing back the audio segments recorded by the microphones from one or more of the sources based on a user-selected area of interest on the corresponding visual image.

38 Claims, 16 Drawing Sheets

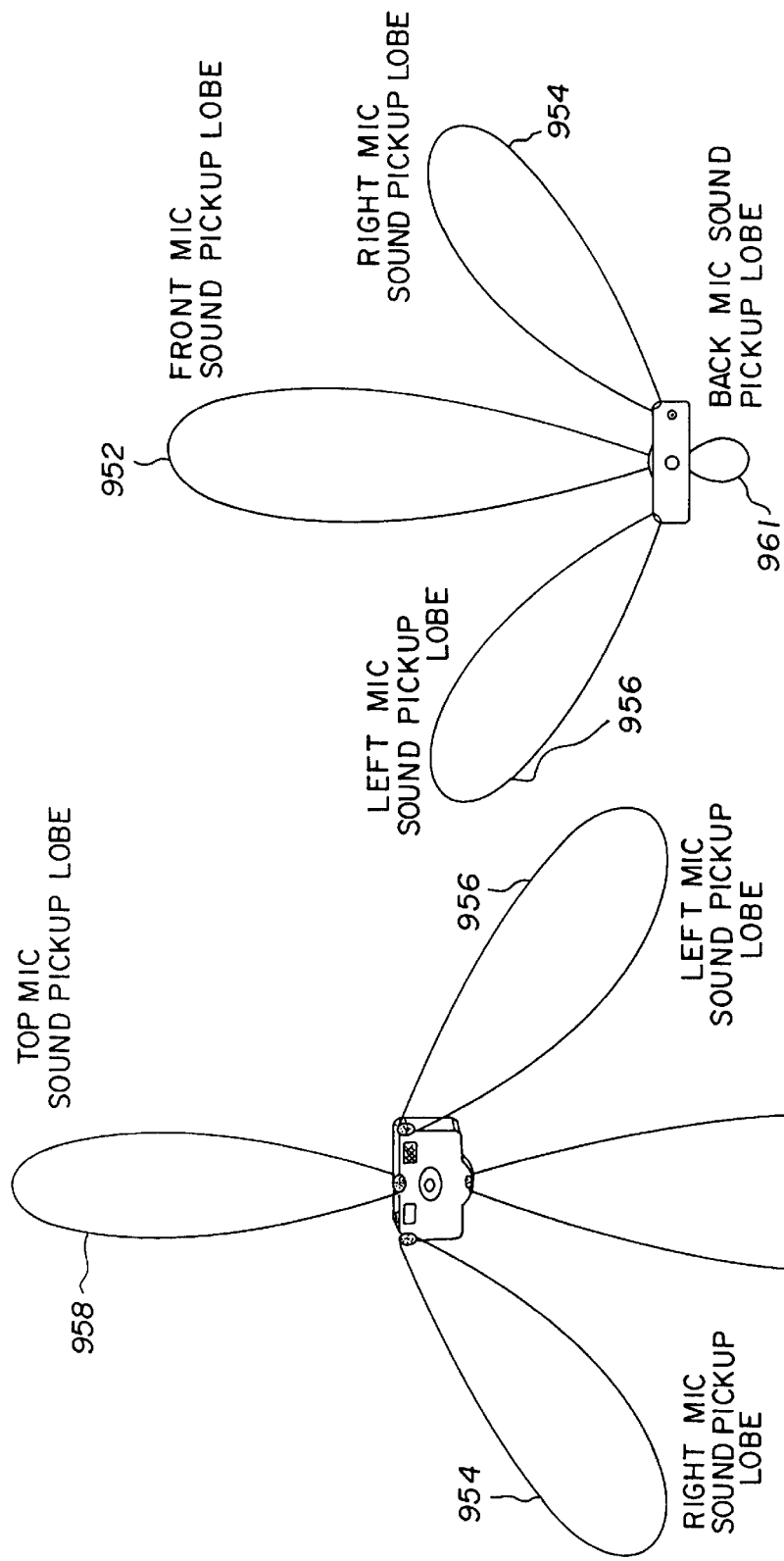

FIG. 19

HEADER INFORMATION

| Audio file Name | Pixel link ctr. coord. | Audio file Name | Pixel link ctr. coord. | Audio file Name | Pixel link ctr. coord. | Audio file Name | Pixel link ctr. coord. | Audio file Name | Pixel link ctr. coord. |
|---|---|---|---|---|---|---|---|---|---|
| Name.ext | x,y | Name.ext | x,y | Name.ext | x,y | Name.ext | x,y | Name.ext | x,y |
| mic_F.AIFF | 512,384 | mic_L.AIFF | 3,384 | mic_R.AIFF | 1024,384 | mic_T.AIFF | 512,3 | mic_B.AIFF | 512,765 |

6,078,758

PRINTING AND DECODING 3-D SOUND DATA THAT HAS BEEN OPTICALLY RECORDED ONTO THE FILM AT THE TIME THE IMAGE IS CAPTURED

FIELD OF THE INVENTION

The present invention relates to photographic images and, more particularly, to such images that have associated audio segments that were recorded at the time the image was captured.

BACKGROUND OF THE INVENTION

Conventional photographs have existed for well over one hundred years, and to this day continue to be a very popular way of capturing visual images for future viewing. However, conventional photographs do have some shortcomings, especially with the advent of video cameras that allow for recording both video clips as well as audio segments. Conventional photographic prints, on the other hand, do not have sound playback capabilities associated with them. Thus, while those photographs do provide visual enjoyment, there is no aural stimulation associated with conventional photographs.

Others have proposed methods of capturing sound using recording devices such as EPROM's, and magnetic media and magnetic write heads. Examples of these methods and devices are disclosed in U.S. Pat. Nos. 5,276,472 and 5,128,700, the disclosures of which are incorporated herein by reference. In these prior art methods the captured sound segment would typically be recorded in a sound card, and a bar code or the like would be printed on the corresponding printed image to serve as an address link between that photograph and the corresponding audio segment. Then, a specially designed machine would read the address data and retrieve the corresponding audio segment from the sound card for playback. Alternatively, the audio segment would be recorded on a magnetic tape and the tape adhered to the printed image. This embodiment similarly calls for a specially configured device in order to play back the audio segment stored on the magnetic tape.

In U.S. Pat. Nos. 5,363,157 and 5,363,158, the rights to which have been assigned to the assignee of the rights in the present invention, a special camera is disclosed that provides for capturing sound at the time an exposure is made, and for optically recording that captured sound as encoded data onto the same film that was used to capture the image. The disclosures of these patents are incorporated herein by reference. The patents disclose exposing a portion of the film with an image, and then optically writing the corresponding audio segment on an adjacent frame. These prior art methods, while being quite satisfactory for their intended purposes, do have some drawbacks. In particular, these methods disclose that the sound data recorded on the film is decoded directly from the film in order to retrieve the audio segments. The sound must then be linked in some manner to the appropriate photographic print. In some instances the sound is decoded from the film and reproduced in another form, such as a bar code that is attached to the photographic print or as a bar code directly printed on the extended edge of the print. Thus this method similarly calls for a special printing device such as an LED in addition to the conventional optical printer used to create a hard copy print from the negative of the image. The bar code either contains the sound data itself or else contains an address pointer to a location in memory where the sound data associated with that print was stored. Thus, these prior art methods all require some specially designed device in order to read the sound data or the audio segment location data.

In addition, many of the prior art devices and methods that allow a user to record an audio segment along with the capture of a visual image do not provide a realistic reproduction of the audio segment recorded. In the first place, the prior art devices only provide one microphone on the camera, and thus will only record one audio segment per image, and will likely fail to record audio emanating from the sides of the area being photographed. In addition, no provision is made in the prior art methods for varying the reproduced audio based upon a user's preference. Therefore, there is no ability for a viewer of the image to select from one or more audio segments associated with the image, or to select an area of interest in the image and to hear the audio originating from that area of the image.

Accordingly, it will be apparent to those of ordinary skill in the art that there continues to be a need for a system for recording and playing back audio segments that does not require a device designed especially for that purpose. In addition, there continues to be a need for a system that provides more flexibility in playing back audio segments and that provides more realistic, surround sound capabilities. The present invention addresses these needs and others.

SUMMARY OF THE INVENTION

In view of the above-described problems of the prior art, it is an object of the present invention to provide a method for printing the sound data associated with a photographic print at the same time the optical image is printed. This lowers the cost to the photo finisher because no extra steps are required.

Another object of the present invention is to provide a method for scanning encoded sound data associated with a particular photographic print using a conventional scanner.

Yet another object of the present invention is to provide a method for scanning the image and/or sound data and transferring the scanned sound data associated with the particular image into a computer, decoding the sound data, and reproducing the sound using the computer, resulting in an efficient, convenient method.

Still another object of the present invention is to capture the sound using multiple microphones on the camera.

Another object of the present invention is to the capture the sound dimensionally as it was heard in the scene using multiple microphones on the camera in such a way that the sound can be played back in a more realistic manner.

Therefore, the present invention in one preferred embodiment comprises a method for capturing and reproducing audio segments in connection with a visual image, comprising the steps of: recording sound segments from plural sources as the visual image is captured; generating a display of the image; allowing a user to navigate across the visual image and to select segments of the visual image; and playing the sound segments from one or more of the sources based upon the user's selection.

In another preferred embodiment, the present invention comprises a system for playing selected audio segments associated with a particular image, the system comprising: a memory for storing at least one image, and a plurality of audio segments corresponding with each stored image; a display for displaying the image; a processor connected to the memory and to the display for retrieving the image and for displaying the image; a user interface connected to the processor for selecting an area of interest of the image; the processor being operative to sense the selected area of interest and for retrieving from the memory the audio segments from one or more of the sources based upon the selected area of interest.

In another embodiment, the present invention comprises a method for reproducing an audio signal from printed sound data associated with a printed image, comprising the steps of: scanning the printed sound data; decoding the scanned sound data; converting the decoded sound data to an audio signal; and playing the audio signal.

In yet another embodiment, the present invention comprises a system for capturing and reproducing at least one audio signal, the audio signal being associated with a visual image, the system comprising: a camera for recording a visual image on film and for recording one or more audio signals associated with the visual image, the camera further including an optical encoder device for optically encoding the recorded audio signal, and an optical write head electrically connected to the optical encoder device for imprinting the encoded audio signal on the film; an optical printer for creating a print of the visual image and encoded audio signal; a scanner for scanning the print and generating scanned data; circuitry connected to the scanner for receiving the scanned data and for decoding the data, and for converting the decoded data to a converted audio signal; and a sound playback unit connected to the circuitry for receiving the converted audio signal and for playing the audio signal.

The foregoing as well as other features and objects of the present invention can be better understood from the following detailed description of preferred embodiments taken in conjunction with the appended claims wherein:

BRIEF DESCRIPTION OF THE DRAWINGS

FIG. 11-1 is schematic showing one embodiment of a camera with multiple microphones for capturing both the sound and the image of a scene;

FIG. 11-2 is schematic showing a second embodiment of the camera with multiple microphones;

FIG. 11-3 is schematic showing a third embodiment of the camera with multiple microphones and having several of the microphones located on a flip-up type flash;

FIGS. 11-4 and 11-5 are schematics showing the camera of FIG. 11-2 and depicting the microphone sound pickup lobes for the various microphones;

FIG. 16a-1 shows a hard copy print of the entire scene;

FIG. 16a-2 shows the same scene, displayed on a computer monitor;

FIG. 16b-1 shows the print of FIG. 16a-1 with an area of interest being highlighted;

FIG. 16b-2 shows the computer monitor displaying an area of interest of the image of FIG. 16a-1;

FIG. 16c-1 shows the print of FIG. 16a-1 with another area of interest being highlighted;

FIG. 16c-2 shows the computer monitor displaying an area of interest of the image of FIG. 16a-1;

FIG. 19 is a schematic showing header data information stored for a plurality of sound recordings.

DETAILED DESCRIPTION OF THE PREFERRED EMBODIMENTS

Figure 1:
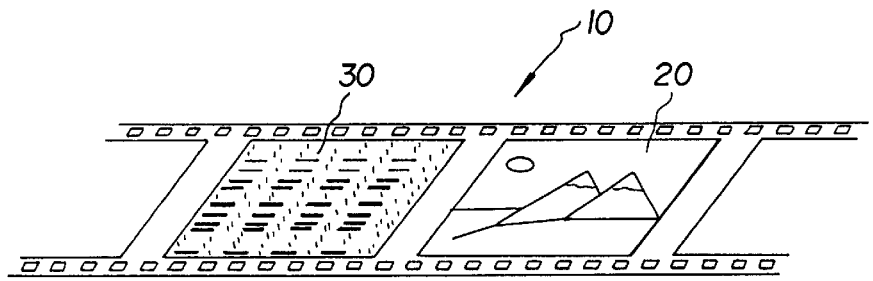
FIG. 1 is a schematic showing a negative film strip comprising a photographic image and recorded sound data.

In the following detailed description, like reference numerals will be used to refer to like or corresponding elements in the various figures. Referring now to the drawings in detail, and more particularly to FIG. 1, there is shown a schematic of a negative film strip 10 comprising a photographic image portion 20 and encoded sound data portion 30 positioned adjacent to the photographic image. The negative strip is preferably created using a suitable camera device such as the camera device disclosed in U.S. Pat. Nos. 5,363,157 and 5,363,158, the disclosures of which are incorporated herein by reference. Those patents disclose a camera including conventional photographic image recording components, audio recording components, an optical encoding circuit for optically encoding the recorded audio segment, and a write head comprising an LED and lens for optically writing the encoded audio signal to the film.

Figure 2:
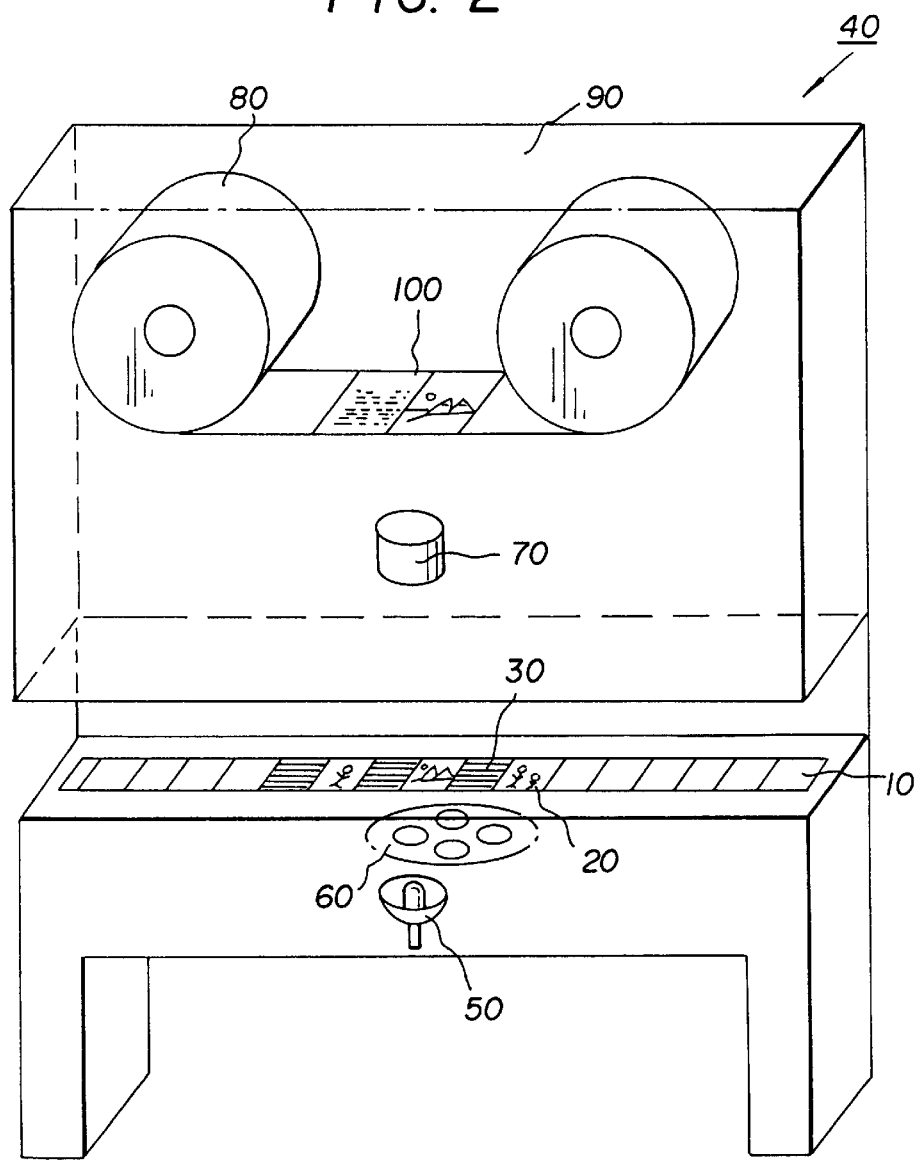
FIG. 2 is a schematic showing the negative strip of FIG. 1 with the image and the recorded sound data being printed using a conventional optical printer.

Now referring to FIG. 2, there is shown the negative strip 10 with the photographic image 20 and the recorded sound data 30 being printed onto photographic paper 80 by means of a conventional optical printer 40 such as a KODAK 312 Digital Printing Unit or a high speed printer such as a KODAK CLAS 35 Printer. The printer 40 includes a conventional light source 50, filter wheel 60, imaging lens 70, and the photographic paper 80, all of which are housed in a printer cabinet 90. The light source 50 exposes the photographic image 20 and the image of the recorded sound data 30 onto the photographic paper to form a latent image 100. The image 100 is then processed using conventional chemical processing techniques to form a processed print 110 (FIG. 3) including a developed photographic image 120 and developed, encoded sound data 130.

Figure 4:
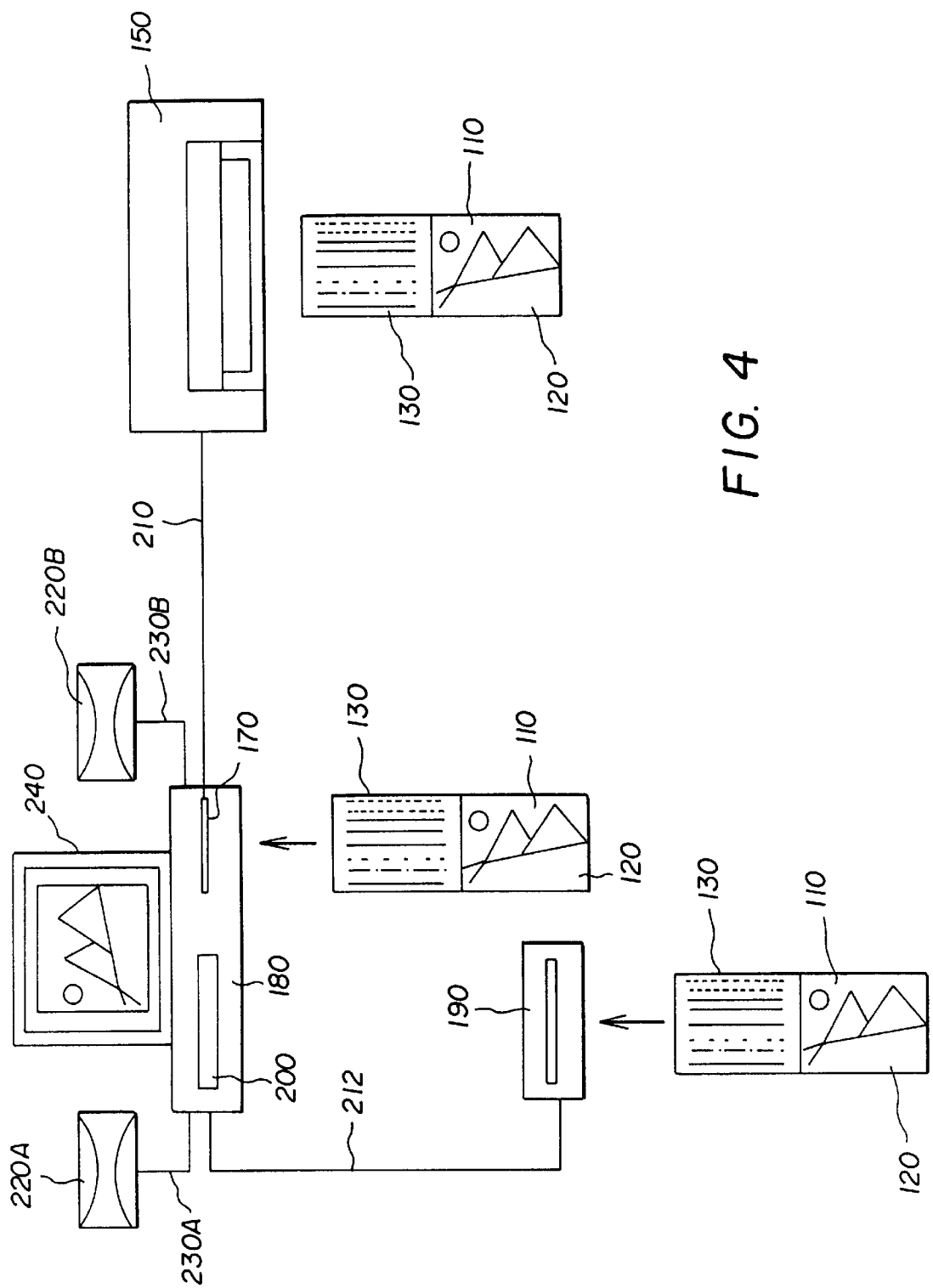
FIG. 4 is a schematic showing the print with the image and sound data being scanned using a reflection scanner connected to a computer for processing.

Referring now to FIG. 4, there is shown a method according to the present invention for audibly reproducing the audio segment from the printed sound data 130 on the developed print 110. The developed print 110 is preferably fed into a conventional flat bed scanner 150, for example a KODAK Digital Print Scanner 1000, a reflection scanner 170 that is built directly into a computer 180 such as an HP Pavilion 7350P computer, or a reflection scanner 190 such as a KODAK Digital Snapshot Photo Scanner I. The print is preferably fed into the scanner with the sound data portion at the leading edge. At the trailing edge of the sound data portion, the print 110 is preferably formed with a digital message recognized by the computer as signifying the end of the sound data. Alternatively, an algorithm stored in the memory 200 of the computer 180 may be used to determine what portion of the print 110 constitutes sound data 130 and what portion constitutes photographic image data 120, as is known in the art. When the print 110 is scanned by the flat bed scanner 150, the scanned, encoded data is transmitted to the computer 180 via an input cable 210. In the computer the data is decoded, corresponding sound data files are created for permanent storage, and the audio segment is reproduced and played back via the computer 180 (FIG. 16), using conventional sound playback components and speakers 220A and 220B connected to the computer 180 via cables 230A and 230B. The sound files can also be linked to the image file by the use of appropriate headers for future playback. The scanned image is preferably displayed on the monitor 240 while the audio segment is played back through the speakers 220A and 220B.

If the print 110 is scanned in reflection scanner 190, the data is transmitted to computer 180 over an input cable 212 and the same process is repeated as with the negative scanned by scanner 150. When the print 110 is scanned by a scanner 170, the process is the same, but there is no need to transmit data over an input cable.

Figure 5:
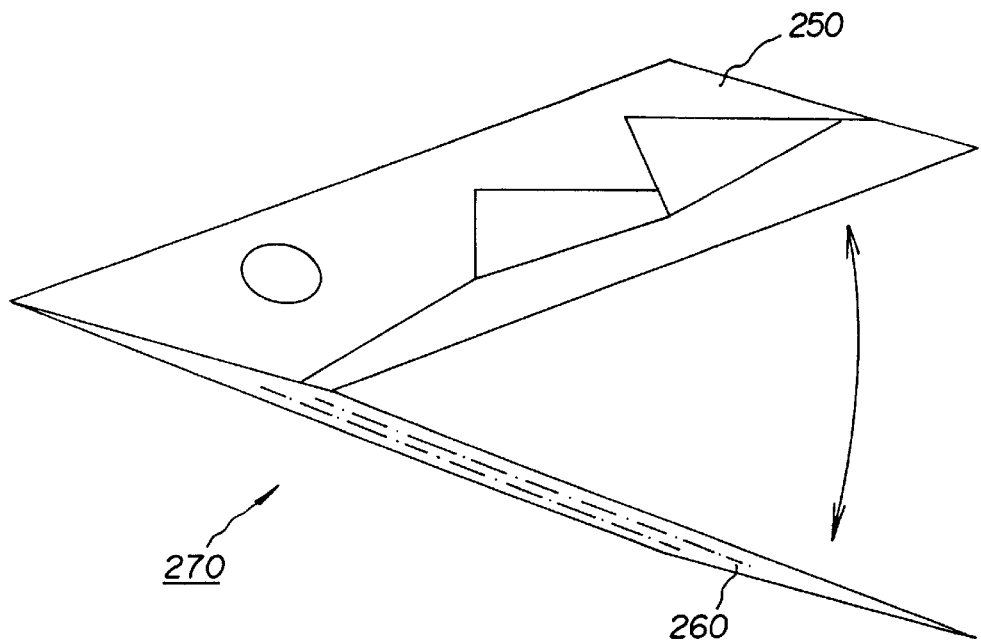
FIG. 5 is a schematic showing the print with the image and sound data folded.
Figure 6A:
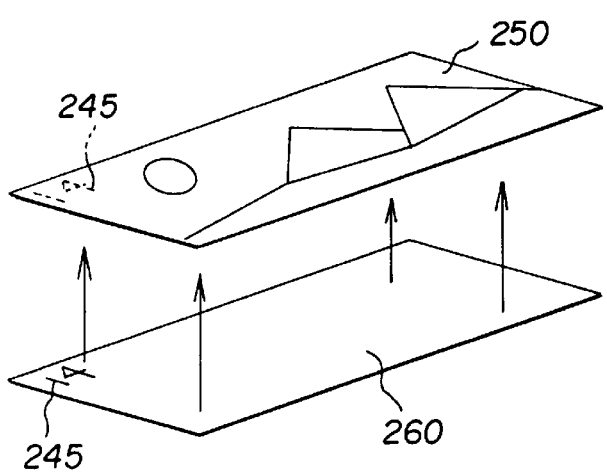
FIG. 6A is a schematic exploded view showing the print with the image and sound data connected back to back and FIG. 6B shows them joined.
Figure 6B:
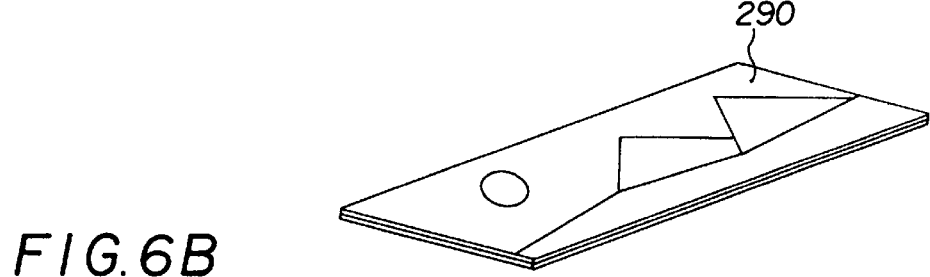

It will be apparent to those of ordinary skill in the art that the print 110 may take many different forms. The image portion 120 and sound data portion 130 may be formed side by side as shown in FIG. 4. Alternatively, the print may be folded at the edge separating the image portion 120 and the sound data portion 130 so that the two portions are oriented back to back, as shown in FIG. 5. The front side 250 containing the photographic image 120 is preferably sealed to the back side 260, thereby forming a double sided print 270. In yet another embodiment, the developed photographic image 120 and the recorded sound data image 130 are cut by the photo finisher and pasted together so the two images are now back to back and form a double sided print 290 (FIGS. 6A and 6B). The developed photographic image 120 and recorded sound data image 130 may also be cut by the photo finisher and linked by back printing a frame number 245 on both without pasting the two images together. In this embodiment, the viewer would scan the recorded sound data image 130 and could physically hold the photograph in his or her hand while the audio segment was played by the computer.

Figure 7:
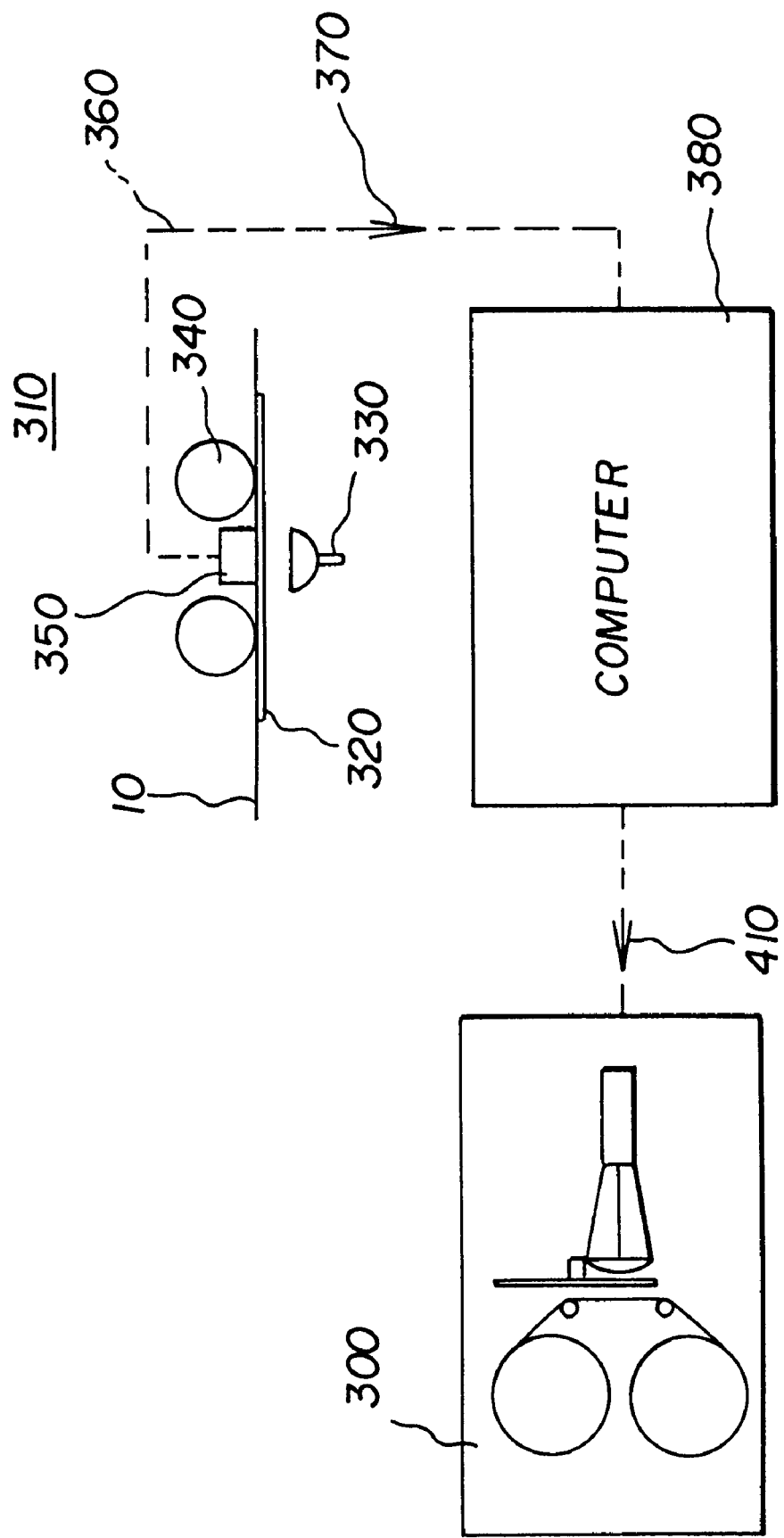
FIG. 7 is a schematic showing a film scanner and digital printer comprising an alternative system for printing the hard copy print.

Referring now to FIG. 7, there is shown an alternative device for generating the recorded sound data image 130. This device comprises a conventional CRT digital printer 300. The printer could alternatively be a thermal, ink jet, laser type printer, or any type of digital printer. In this embodiment, the negative strip 10 is scanned by a film scanner assembly 310. The film scanner assembly 310 includes a film path 320, a light source 330, a drive roller assembly 340, and a sensor 350 that is connected via a cable 360 to a computer 380 for transmitting sensed data to the computer in the direction of arrow 370. The image and sound data are processed by computer 380 and sent to the CRT printer 300 via cable 400 in the direction of arrow 410. The resulting print is the same as the print shown in FIG. 3.

Figure 8:
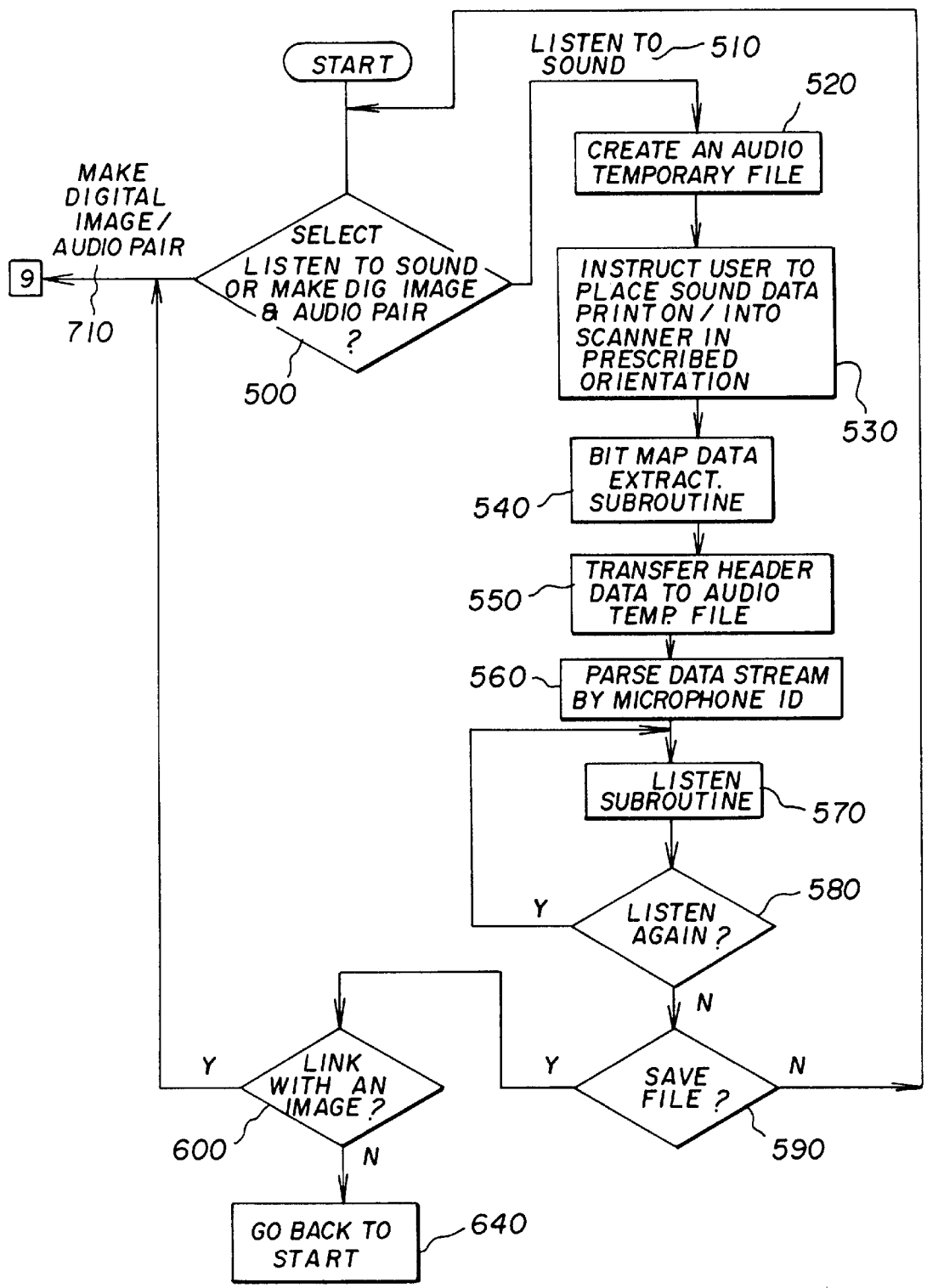
FIG. 8 is a flow chart depicting the operational flow for creating and storing a sound data file linked to a corresponding image file.

Now referring to FIG. 8, the operational flow of the computer subroutine that receives scanned data from a scanner and enables audio playback will be described. Initially, the user may choose to convert a sound data print 130 to audible data to listen to it, or to combine it with its digital image for other uses, as indicated by query block 500. If the user desires to merely listen to the sound data print, the "listen to sound" path 510 is selected. The first step, indicated by function block 520, is to create a temporary file in the computer memory for the incoming scanned audio data. The user is instructed to place the sound data print 130 on or into his scanner in a prescribed orientation, at step 530.

Figure 18:
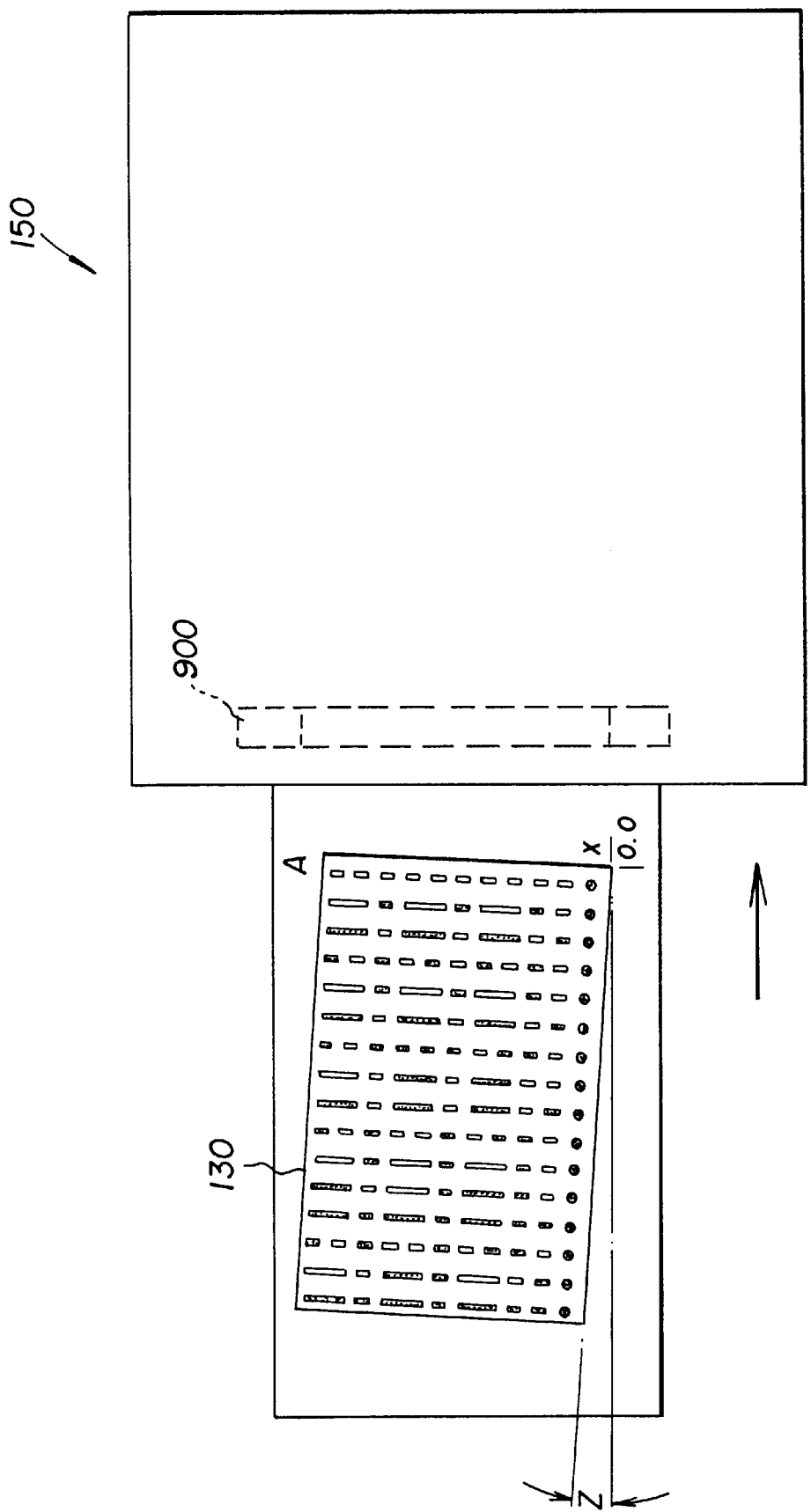
FIG. 18 is a schematic showing the placement of optical sound data print on a flatbed scanner with a skew angle Z.

The prescribed orientation, depicted in FIG. 18, is one in which a start sentinel "A" formed on the sound data print 130 will be scanned first, before the actual sound data on print 130 is scanned. For the purpose of illustration, FIG. 18 shows the placement of the sound data print 130 on the scanner 150 such that the column of elongated pixels which constitute the start sentinel "A" are the first line of data scanned. This is necessary to enable correction of any skew present between the printed data and the scanner read element array 900. The elongated edges of the start sentinel are scanned and interpreted by the computer to determine whether any skew angle exists and to account for any such angle when the scanned sound data is interpreted. This insures that subsequent routines can also properly utilize the edge clock track, denoted as row X in FIG. 18, to correct for film transport rate variations. While the scanner shown requires that the image be scanned face-up, it will be apparent that other types of scanners may be used that require the print to be placed face down with the 0,0 reference corner in another position, as required by the direction of movement of the scanner head. As long as the start sentinel leads the field, the routine will succeed in data interpretation.

Now continuing with the operational flow of the computer and again referring to FIG. 8, the scanned sound data is transmitted to the computer where it then goes through a bit map data extraction routine, at step 540. The function of this routine is to convert the digitized bit map image of sound print 130 into a data stream. This is done by sampling the bit map at positions which correspond to data points. The bit map is sampled with a skew correction in the Y-axis, and a clock track correction in the X-axis as described above. The resulting data is preferably sent to a data stream parser where two operations are performed. The first, step 550, is to read from the data stream information about the sound data to follow, such as the number of microphones that were used to record the audio segments. This header data is copied into the temporary file. The second step, 560, is to parse the data stream into sections, one section per microphone or sound source, where more than one microphone or sound source was used.

Once the data has been completely parsed, the temporary file is passed to the listen subroutine which blends the audio and reproduces it audibly through the computer's speakers, at step 570. The blending methodologies are described in greater detail below. Following the first playback of audio, the user is given the options of listening again (step 580 ), saving the audio to a permanent file (step 590), or linking the audio to an image file stored in the computer memory (step 600). If not, operation flows back to start, at step 640. If none of these operations in steps 580, 590, or 600 and 610 are desired, operation then flows back to the beginning (step 500) to scan another sound data print.

Figure 9:
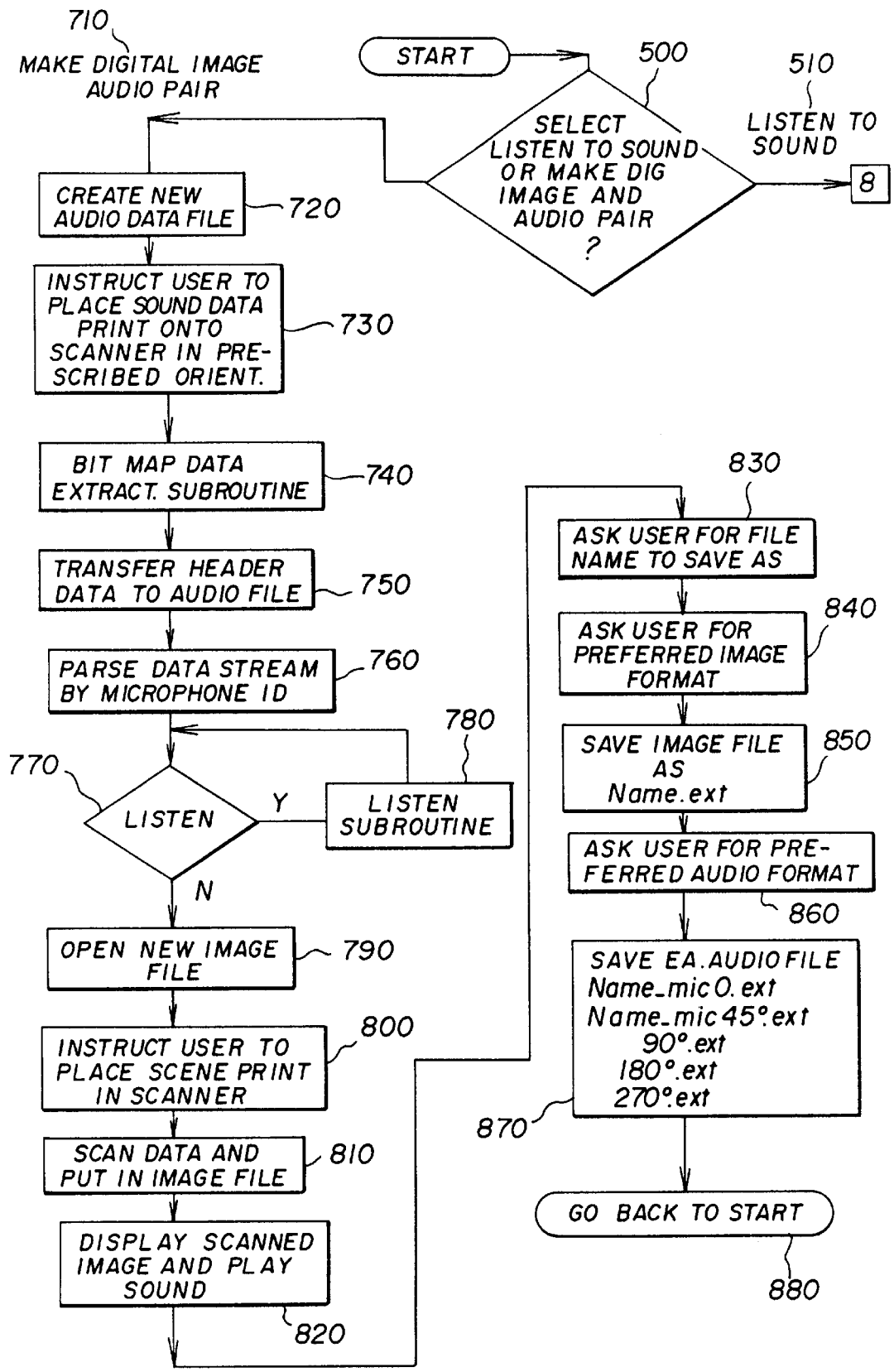
FIG. 9 is a flow chart depicting the operational flow for creating a sound data file linked to a corresponding image file and storing the files as a linked image/audio pair.

Now referring to FIG. 9, there is shown a flowchart illustrating the operational flow for making and linking an electronic digital image and audio pair created from an image print 120 and optical sound recording 130. If the user chooses to make an image/audio pair at step 500, operation flows along the "make digital image/audio pair" path 710. Initially, a new audio data file is created, at function block 720. The user is then instructed to place the sound data print 130 onto or in the scanner in the prescribed orientation, block 730, so that the sound data is preferably scanned first. The scanned data then goes through a bit map data extraction subroutine, block 740 to convert the digitized bit map image of sound print 130 into a data stream. As with the operational flow in connection with FIG. 8, the bit map is sampled with a skew correction in the Y-axis and a clock track correction in the X-axis in order to properly interpret the scanned data. The resulting data is sent to a data stream parser where two operations are performed. The first, at function block 750, is to read from the data stream ID information concerning the sound data to follow, such as the number of microphones that were recorded. This ID information is copied as header information into a file (FIG. 19). The second step is to parse the data stream into sections at step 760, one section per microphone or sound source, where more than one microphone or sound source was used.

Once the data has been completely parsed, the permanent file is passed to the listen subroutine which blends the audio and reproduces it audibly through the computer speakers, at block 770. Following the first playback of audio, the user is given the options of listening to the audio segment again (step 780) or linking the audio segment to an image file, beginning at block 790. If the user chooses to link the audio segment, the user is instructed to place the printed image into or on the scanner, at block 800. The scanned image data is then stored in an image file, at function block 810. The scanned image is then displayed and the associated audio segment is played back, at block 820, to make certain that the correct image and audio segment are being linked together. If so, the user is then asked for a file name to save the data, at block 830. The user is then asked for a preferred image format, block 840. The image file is then saved in, for example, a JPEG, MPEG, TIF, or other similar file format as selected by the user, at block 850. The user is then asked for a preferred audio format, block 860, and the one or more audio files associated with that particular image are then saved at block 870 in the selected format, such as MPEG, WAV, AIFF, and similar formats. A file ID is created and saved in a look-up table which links both the image data and sound data together for future referral. The user is then finished or can go back to Start, block 880.

Figure 10:
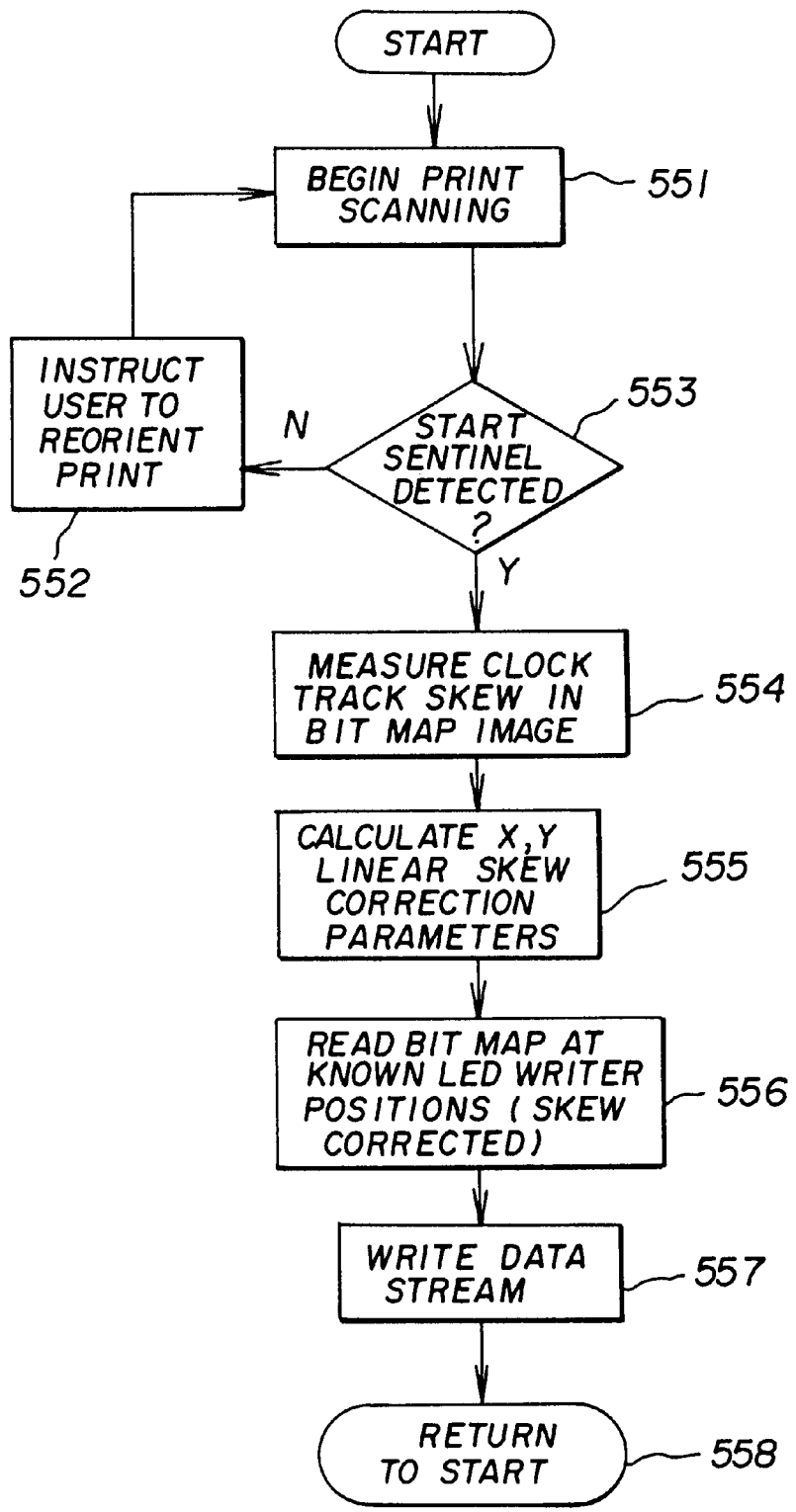
FIG. 10 is a flow chart showing a bit map data extraction subroutine.

Referring now to FIG. 10, the operation of the bit map data extraction subroutine will be described, corresponding with block 540 of FIG. 8 and block 740 of FIG. 9. Initially, the scanner begins to scan the print, block 551. If the scanner does not detect the start sentinel A as the first images on the print, the print is improperly oriented, and the user is instructed to reorient the print, at function block 552. When the start sentinel A is detected, the leading bit map edge is set to t=0 in block 553. The clock track skew is measured in the bit map image by calculating the slope of the skew Z (FIG. 18), at block 554. Linear skew correction parameters x,y are calculated at block 555. The bit map is read at the known scanner pixel positions (refer to FIG. 18) with corrections for any skew, at block 556. The data stream is then written, at block 557. The user can then return to start, block 558, to repeat the process.

Figures 1, 11:
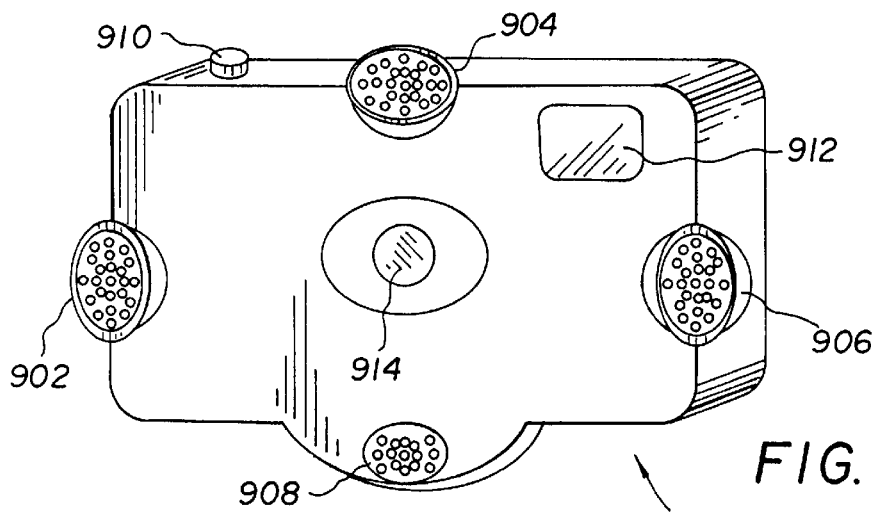
Figures 2, 11:
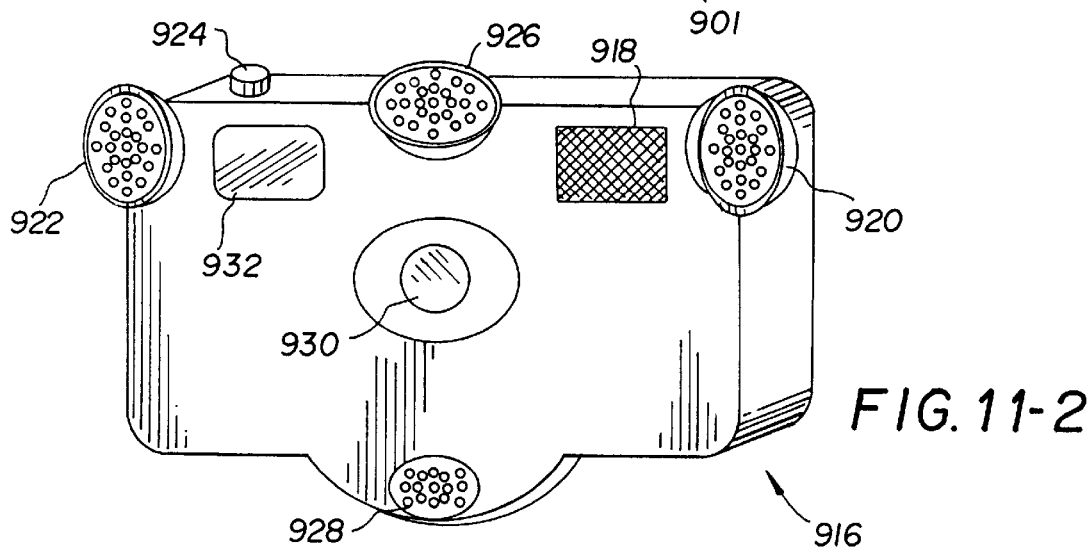
Figures 3, 11:
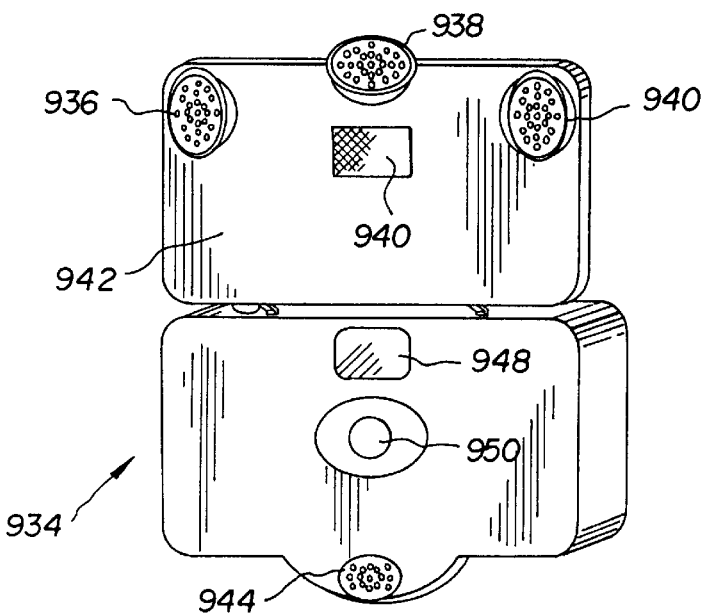

Now referring to FIG. 11-1, there is shown one preferred embodiment of a camera 901 of the present invention that incorporates multiple microphones. Again, for illustration purposes only, five microphones will be used but one can envision a camera with more or less microphones. The camera includes a right microphone 902, top microphone 904, left microphone 906, front microphone 908, and a back microphone (not shown) that faces away from the area to be photographed. The placement of the right and left microphones is preferably at an angle of 45° or more with respect to the direction the lens faces in order to capture sounds originating from the periphery of the area being photographed. A standard shutter button 910, viewfinder 912, and lens 914 are included and shown for reference purposes.

FIG. 11-2 illustrates another embodiment of a camera 916 incorporating multiple microphones according to one aspect of the present invention. Again the five microphone system will be used for illustration purposes only. The design of the camera in FIG. 11-2 dissuades the user from placing a finger over the microphones or flash 918 because the housing protrudes outwardly from the left microphone 920 and right microphone 922 of the camera, forcing the user to grip the camera below the microphones. The camera has a shutter button 924, top microphone 926, front microphone 928, lens 930, and viewfinder 932. A back microphone is included (not shown) that faces in a direction opposite of the front microphone. The orientation of the right and left microphones is preferably at an angle of 45° or more with respect to the direction the lens faces, as with the embodiment shown in FIG. 11-1.

Figure 3:
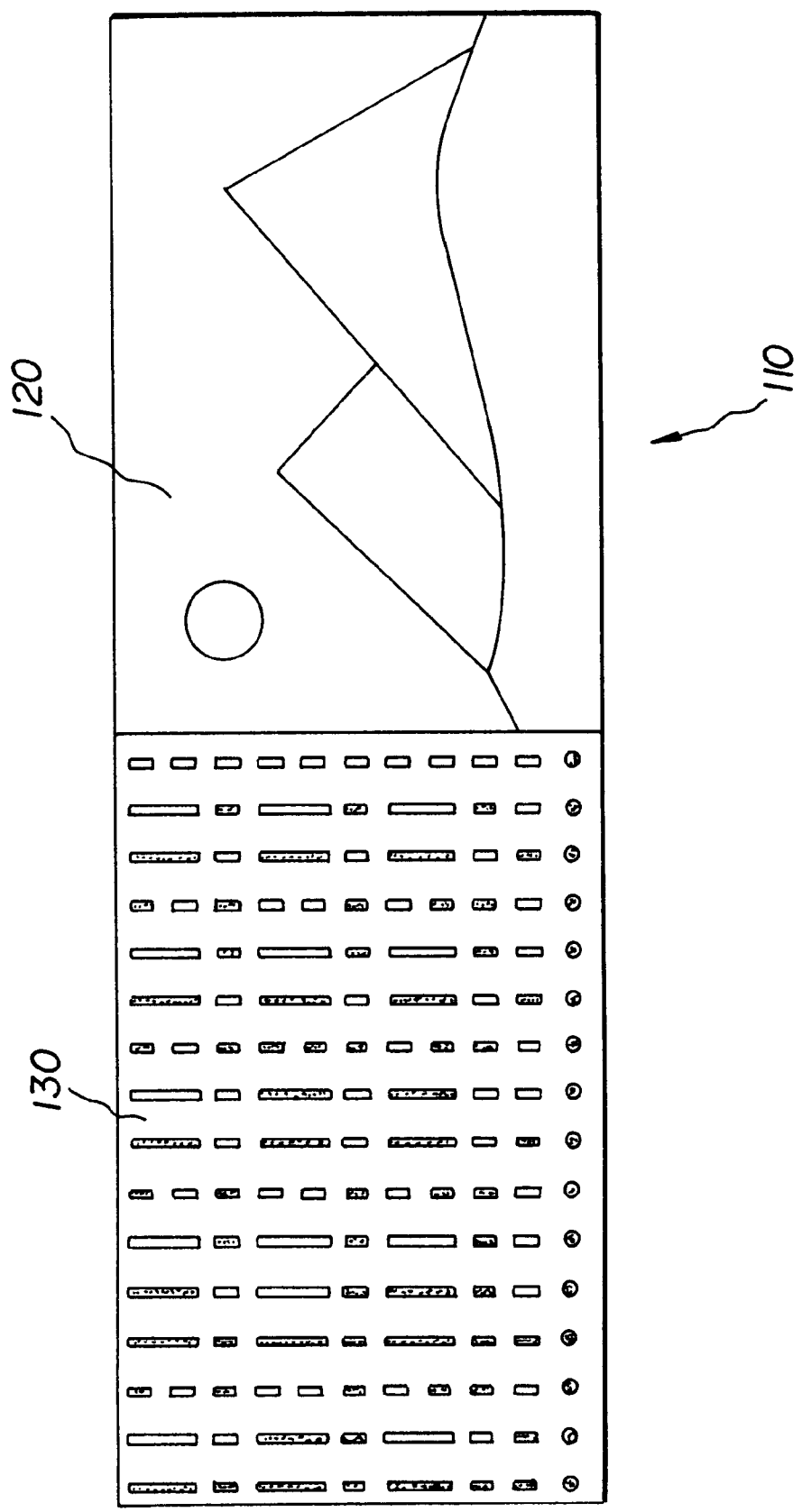
FIG. 3 is a schematic showing a hard copy print comprising the image and encoded sound data.

Referring to FIG. 11-3, there is shown yet another embodiment of a camera 934 with multiple microphones, including a right microphone 936, top microphone 938, and left microphone 940, each of which is mounted in the camera flip flash lid 942. A front microphone 944 and back microphone (not shown) are also provided. The camera 934 preferably includes a flash 946, viewfinder 948, and lens 950.

Referring to FIGS. 11-4 and 11-5, depictions of the microphone sound pickup lobes for each microphone mounted on the camera 901 is shown. It will be apparent that the front microphone 908 has a pick-up lobe 952 that covers an area directly in front of the camera, and thus the majority of the audio recorded by the front microphone will be generated directly in front of the camera. Similarly, the right and left microphones 902 and 906 have respective pick-up lobes 954 and 956 that cover the respective sides of the camera. The top microphone 904 records audio coming from above the camera as indicated by lobe 958, and the back microphone (FIG. 11-5) records audio coming from behind the camera as indicated by lobe 961.

Figure 12:
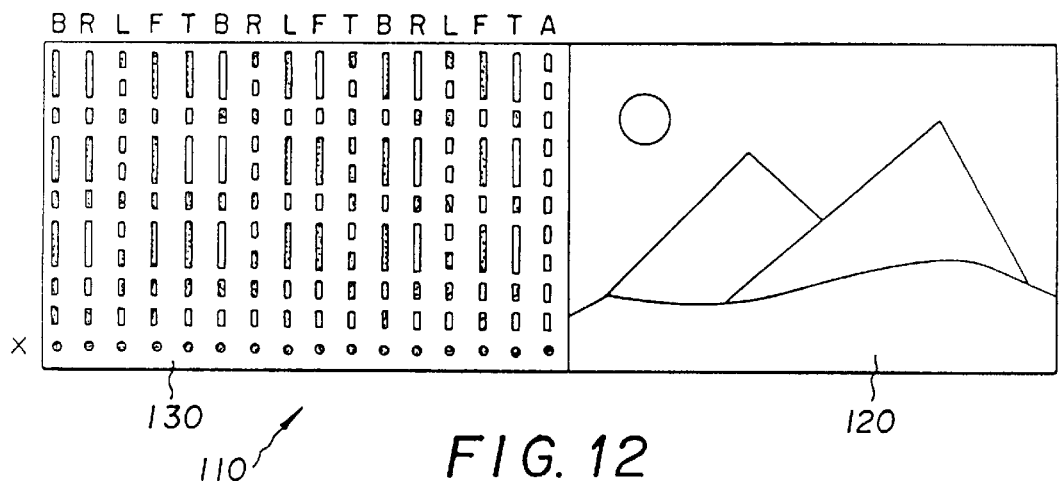
FIGS. 12–14 are schematics showing different configurations of the hard copy print with the image and interleaved optically recorded sound data from plural microphones.

Referring now to FIG. 12, there is shown a hard copy print 110 including a printed image 120 and sound image 130 similar to that shown in FIG. 3, with the optically recorded sound data attached to the left of the image 120 and including a start sentinel A immediately following the printed image and a clock track X. For the purposes of illustration, labels will be used. The columns designated with the letter F represent the audio recordings from the front microphone, L for the left microphone, R for the right microphone, B for the back microphone, and T for the top microphone. The respective columns are interspersed so that, for example, upon scanning the first five columns a first portion of the audio segments from each microphone may be played.

Figure 13:
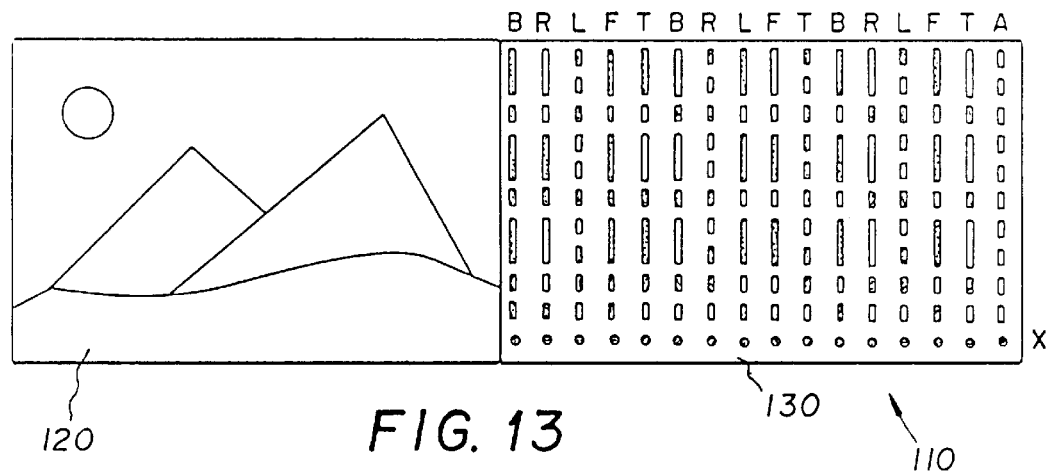
Figure 14:
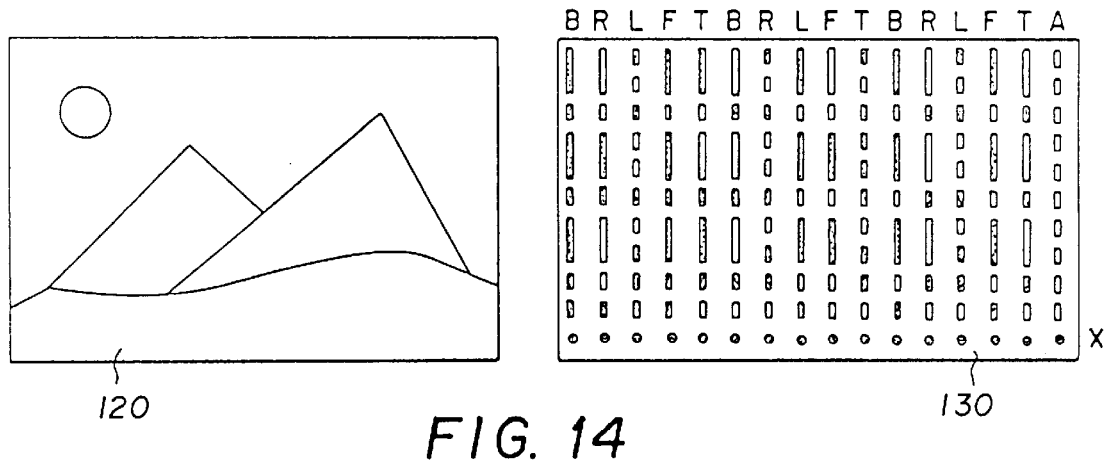

FIGS. 13 and 14 show alternative methods for preparing the prints 110, with the sound data image preceding the visual image in FIG. 13, and with the sound image and visual image separated in FIG. 14.

Figure 15:
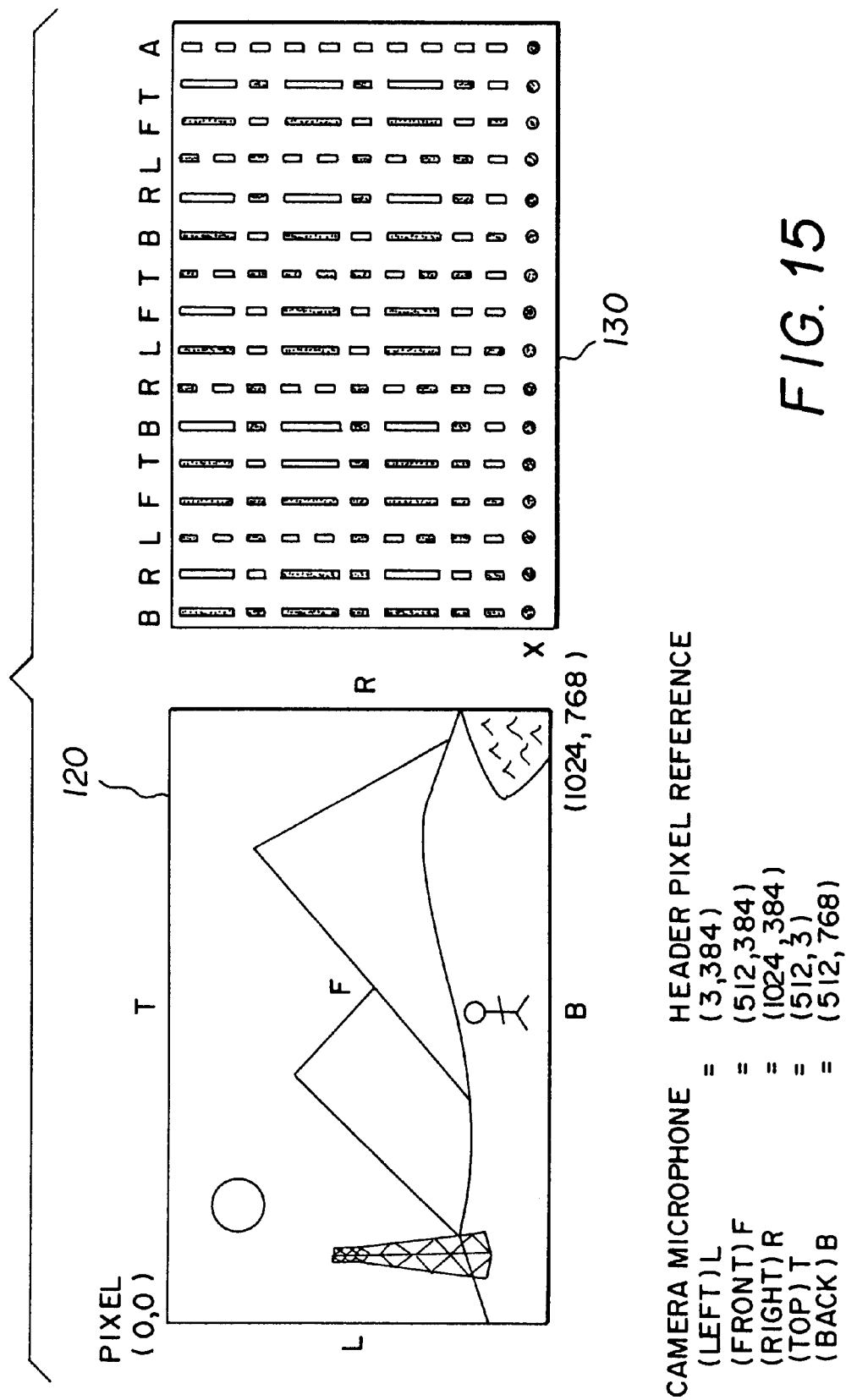
FIG. 15 is a schematic showing an image print and the corresponding recorded sound data with the plural microphones being assigned respective image pixel locations corresponding to the areas covered by the respective microphones.

Referring now to FIGS. 15 and 19, FIG. 15 shows a schematic of the print 120 as would be displayed on a computer screen or the like, with the corresponding optical audio print 130, and FIG. 19 shows the associated header data information for the audio segments recorded from the plurality of microphones. Each microphone is assigned a pixel coordinate location by the computer based upon the areas sensed by the respective microphones, and that location is stored in the header memory. A surround sound or 3D sound effect can be created from this system as now described in greater detail. As the user navigates across the computer display through the use of a user interface device such as a mouse, keypad, or touch screen, different sounds that each microphone picked up would become more predominate, as controlled by the computer processor, which monitors the user's navigation across the image. Thus, if the user navigated toward the left side of the print, the audio recorded by the left microphone would become the dominant sound output by the computer. As the user moved toward the center of the print, the sounds recorded by the left, right, and front microphones would be more equally balanced, but with the sound from the front microphone preferably being the dominant sound. As the user navigated toward the right side of the print, the sounds recorded by the right microphone would predominate over the sounds recorded by the other microphones.

Thus this mode of operation enables a user to use his or her computer and its peripheral equipment to convert hard copy images and sound data into digital files for on-line storage and enhanced viewing and listening capabilities. An example of the latter is the navigational virtual reality sites that are now provided on the world-wide web. A person browsing the web can view a portion of a scene at a time, and by panning and zooming, get the illusion that they are exploring the scene. This tends to convey a stronger feeling of immersion of the individual so engaged. The sense of immersion can be further enhanced by utilizing surround sound concepts to the navigation, as are provided in the instant invention.

Figures 1, 16A:
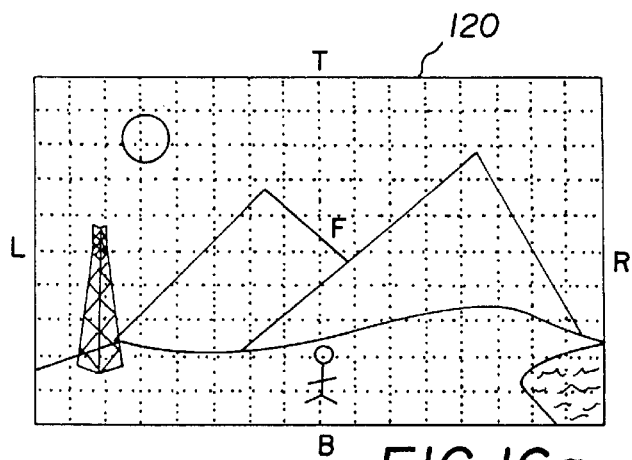
Figures 2, 16A:
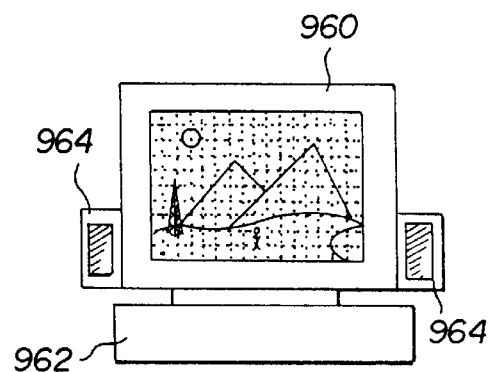
Figures 1, 16B:
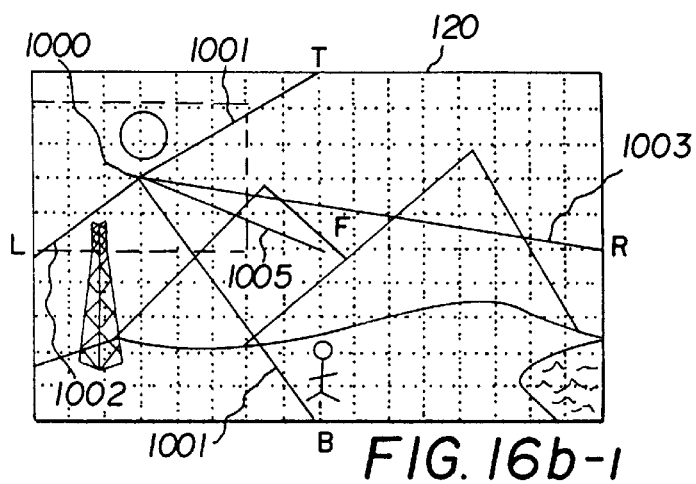
Figures 2, 16B:
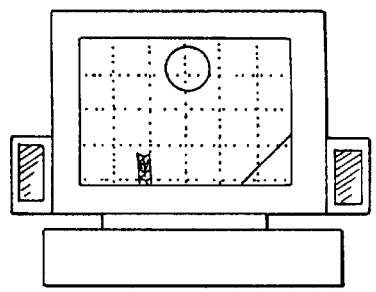

The method of blending the audio segments will now be described in connection with FIGS. 16a–c. FIG. 16a-1 shows a hard copy print 120 of a scene. FIG. 16a-2 shows the same scene, displayed on a computer monitor 960. A computer 962 and its associated speakers 964 are also shown. If a viewer was looking at the whole image in this manner, the sounds from the scene would be blended by the computer in a natural proportion, so that the viewer would hear audio much as he or she would if back at the scene viewing the same perspective first hand. However, if the viewer chooses to zoom in and pan over to an area of interest in the scene, such as the area of interest shown in FIG. 16b-2, then the balance of the audio is preferably modified to enhance what is being viewed. The section of the scene viewed on the monitor in FIG. 16b-2 is highlighted in gray in the full image view, FIG. 16b-1 for purposes of illustration.

The computer 962 is programmed to determine the straight-line distance from the center of the area of interest 1000 to the designated pixel coordinate locations for each microphone stored in the header information (FIG. 19). This is done by determining the pixel coordinates for the center of the area of interest and calculating the distance from those coordinates to each microphone's pixel coordinates. This is illustrated schematically in FIG. 16b-1 by the vectors leading to each sound source. Vector 1001 is shown between the center of the area of interest and the top microphone coordinate position. Similarly, vectors 1002 through 1005 are shown between the center of the area of interest and the other microphone coordinate positions. The vector length can be used to adjust the audio balance that would be appropriate when viewing this area of interest. Because sound volume falls off as the square of the distance from source to listener, the dominant sounds preferably will be those recorded from the sound sources nearest the viewer. For a number of sound sources I, this may be expressed as the following:

$$\text{Audio blend} = Vu \left\{ \sum_i Mi / [(Cx - Mix)^2 + (Cy - Miy)^2] \right\}$$

where

Vu=users overall volume gain control

Cx=x coordinate of center of viewed area

Cy=y coordinate of center of viewed area

Mi=digital values of sounds captured by microphone or sound source i

Mix=x coordinate of microphone or sound source i

Miy=y coordinate of microphone or sound source i

It would be normal to calculate the vector length as the root of the sum of the two sides, the x and y distances respectively. However, since sound falls off as the distance squared, in this instance the square root would be taken and the result would be squared, so the two operations cancel. When the area of interest is centered directly on a sound source, the source may be considered in two ways. First, it may be treated as the dominant soundtrack in the audio blend. In this case, the system may choose to play only audio from that source. This can be expressed as the following:

$$\text{if } |Cx - Mix| > 0 \text{ and } |Cy - Miy| > 0,$$

$$\text{Audio blend} = Vu \left\{ \sum_i Mi / [(Cx - Mix)^2 + (Cy - Miy)^2] \right\}$$

else,

Audio blend=Vu*Mi

An alternate approach for the case when a the viewing window is centered directly on a sound source would be to give the centered sound source a specified fraction of the volume in the blend and treat the other sources normally. This can be expressed as the following:

if |Cx−Mix|>0 and |Cy−Miy|>0, $$\text{Audio blend} = Vu \left\{ \sum_i Mi / [(Cx - Mix)^2 + (Cy - Miy)^2] \right\}$$

else,

Audio blend =

$$c1 * Vu * Mo + (1 - c1) * Vu \left\{ \sum_i Mi / [(Cx - Mix)^2 + (Cy - Miy)^2] \right\}$$

where c1=a preselected fraction of volume in the blend.

Mo=digital values of sound from microphone on which the display is centered

Alternatively, the computer could simply determine which sound source was the closest to the center of the area of interest and only play the audio segment recorded by that sound source. Or, the computer could choose the two closest sound sources and play the audio segment recorded by each at the same volume. It will be apparent that a virtually unlimited number of combinations are available for playing back the audio based on the selected area of interest.

For the example shown in FIG. 16b-2, the sound recorded by the left microphone would preferably be the loudest, and could be blended with the sounds from the top and front microphones. Hearing the sounds from the top and front microphones might cause the viewer to pan to the right, causing the sounds from the top and front microphones to predominate the audio output, thus enhancing the navigation experience.

Figures 1, 16C:
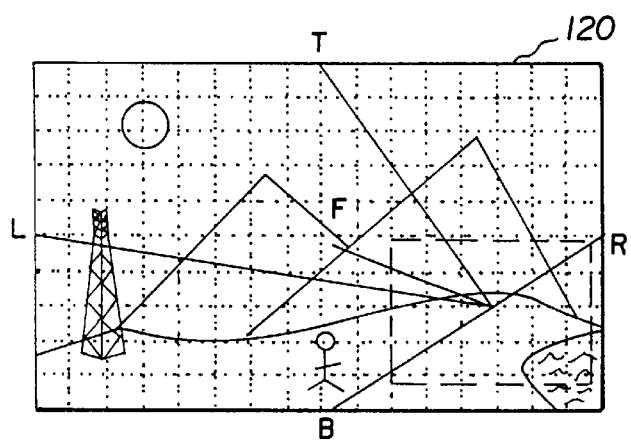
Figures 2, 16C:
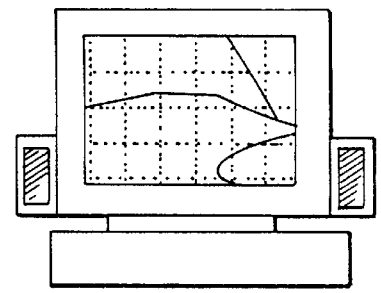

Another example of a different part of the scene being viewed is shown in FIGS. 16c-1 and 16 c-2. Again, the shaded area on FIG. 16c-1 highlights the portion of the scene that the user has selected as the area of interest. The vectors to the sound sources are again shown with lines emanating from the center of the viewed area, as determined by the computer. In this example, the sounds recorded by the right microphone would predominate, with the sounds from the back and front microphones also being played, but at a lower level.

Figure 17:
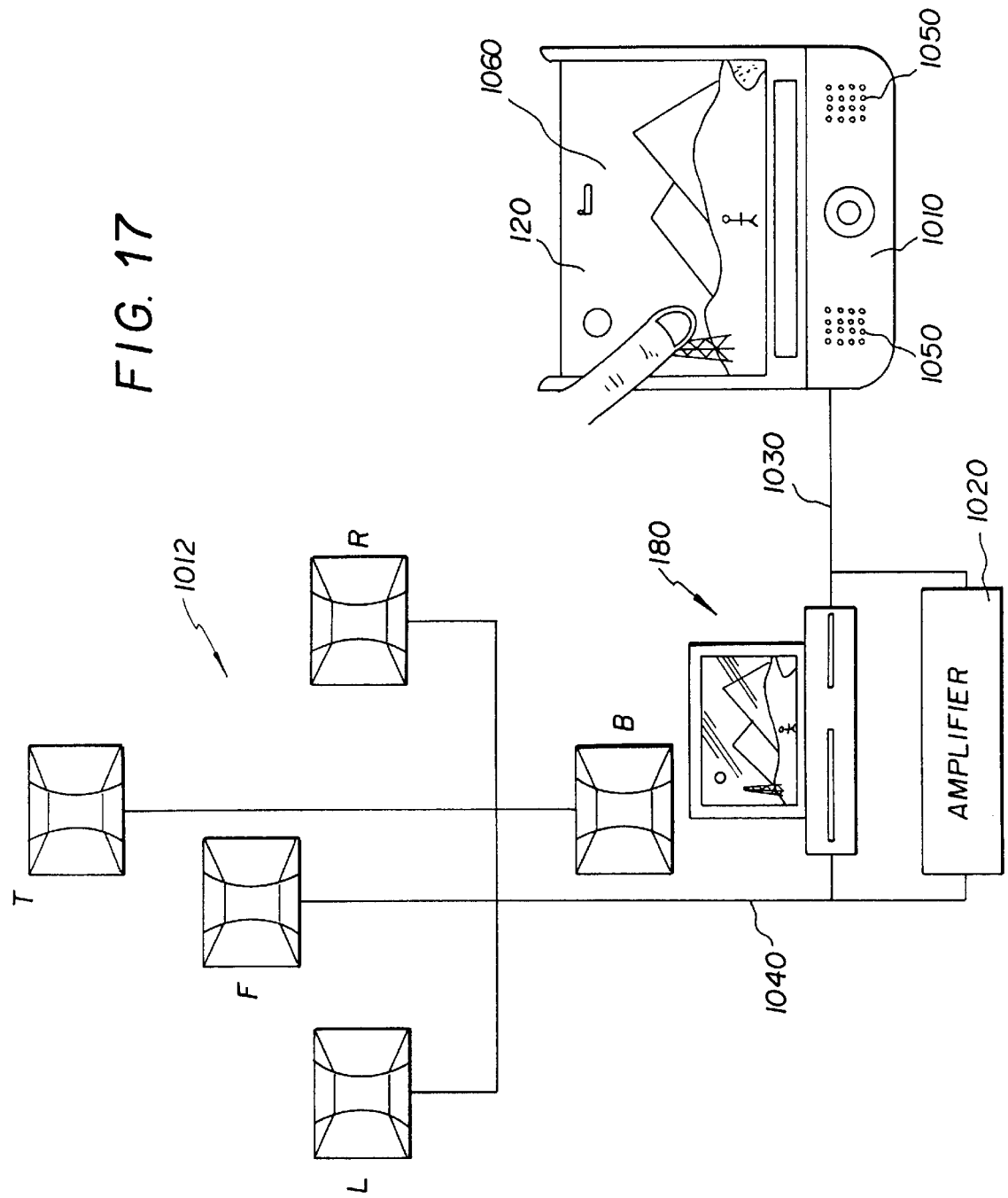
FIG. 17 is a schematic showing a player unit displaying an image and including an interactive touch screen to allow the user to select an area of interest.

Now referring to FIG. 17, there is shown schematically a scene print 120 being displayed in a player unit 1010 connected to the computer 180 of FIG. 4. A form of the player unit is disclosed in U.S. patent application Ser. No. 08/705,350, the disclosure of which is incorporated herein by reference. The player 1010 is connected to a speaker system 1012 via an amplifier 1020 and cables 1030 and 1040, and includes a touch screen 1060. As the user touches an area of the touch screen corresponding with a portion of the print 120, the computer determines the area of interest selected and performs the same routine described above in order to calculate the distances from the area of interest to the respective microphone pixel locations. Thus the sound from the closest microphone would predominate, or alternatively would be the only sound played back through the speaker system 1012. If the player is not connected to the amplifier 1020, the sound may be played back through the speakers 1050. Alternatively, the player could simply select the sound source closest to the area of interest, or the two closest, or the like, and play the audio segments associated with the one or more sources.

While several forms of the instant invention have been illustrated and described, it will be apparent to those of ordinary skill in the art that various modifications and improvements may be made without departing from the spirit and scope of the invention. Accordingly, it is not intended that the invention be limited, except as by the appended claims.

Parts List 10 negative strip
20 photographic image portion
30 sound data portion
40 optical printer
50 light source
60 filter wheel
70 imaging lens
80 photographic paper
90 printer cabinet 90
100 latent image
110 processed print 10
120 photographic image
130 encoded sound data portion
150 flat bed scanner
170 reflection scanner
180 computer
190 reflection scanner
200 memory of computer 180
210 input cable
220A, 220B speakers
230A, 230B cables
240 monitor
245 frame number
250 front side
260 back side
270 double sided print
290 double sided print
300 CRT digital printer
310 film scanner assembly
320 film path
330 light source
340 drive roller assembly
350 sensor
360 cable
380 computer
400 cable
900 scanner reader array
901 camera
902 right microphone
904 top microphone
906 left microphone
908 front microphone
910 shutter button
912 viewfinder
914 lens
916 camera
918 flash
920 left microphone
922 right microphone
924 shutter button
926 top microphone
928 front microphone
930 lens
932 viewfinder
934 camera
936 right microphone
938 top microphone
940 left microphone
942 flip flash lid
944 front microphone
946 flash
948 viewfinder
950 lens
952 front microphone pick-up lobe
954 right microphone pick-up lobe
956 left microphone pick-up lobe
958 top microphone pick-up lobe
960 computer monitor
961 back microphone pick-up lobe 962 computer
964 speakers
1000 area of interest
1001–1005 vectors
1010 player unit
1012 speaker system
1020 amplifier
1030, 1040 cables
1050 speakers
1060 touch screen
A start sentinel
B back microphone recordings
F front microphone recordings
L left microphone recordings
R right microphone recordings
T top microphone recordings
X edge clock track

What is claimed is:

1. A method for capturing and reproducing sound in connection with a visual image, comprising the steps of:

recording sound segments from plural sources as the visual image is captured;

generating a display of the image;

allowing a user to navigate across the visual image and to select one or more areas of interest of the visual image; and playing the sound segments from one or more of the sources based upon the user's selection.

2. The method of claim 1 wherein the step of recording comprises recording sound segments from a plurality of microphones arranged at various orientations.

3. The method of claim 1 wherein the step of playing comprises assigning coordinate locations of the display to each microphone, and playing only the sound segment recorded by the microphone with the coordinate location closest to the user selected area of interest.

4. The method of claim 1 wherein the step of playing comprises playing sound segments from a plurality of the microphones, where the sound segment from the microphone closest to the area of interest is played at a preselected volume.

5. The method of claim 1 wherein the step of playing comprises blending the sound segments from all of the microphones, where the volume for playing each sound segment is determined by the distance from the area of interest to the respective microphones.

6. The method of claim 1 wherein the step of allowing the user to navigate comprises providing at least one of a touch screen, mouse, light pen, and keyboard to allow the user to select the area of interest.

7. A system for reading and interpreting encoded sound data printed on a photographic sheet, the sound data being recorded from a plurality of sources, the system comprising:

a scanner that can be used to scan the image and encoded sound data;

a processor connected to the scanner, said processor receiving the scanned image and sound data, the processor being programmed to decode the encoded sound data;

a display connected to the processor, said display displaying the scanned image;

a user interface connected to the display and to the processor, said interface allowing a user to select an area of interest on the image;

the processor being responsive to the user's selections to select decoded sound data from one or more of the sources based upon the area of interest selected; and a sound playback device connected to the processor for receiving the selected decoded sound data and playing a corresponding audio signal.

8. The system of claim 7 wherein the user interface comprises at least one of a touch screen, mouse, light pen and keyboard.

9. The system of claim 7 wherein the processor assigns coordinate locations of the display to each microphone and is responsive to the area of interest selected to play only the sound segment recorded by the microphone closest to the selected area of interest.

10. The system of claim 7 wherein the processor assigns coordinate locations of the display to each microphone and is responsive to the area of interest selected to play sound segments from a plurality of the microphones and to play the sound segment from the microphone closest to the area of interest at a preselected volume.

11. The system of claim 7 wherein the processor assigns coordinate locations of the display to each microphone and is responsive to the area of interest selected to blend the sound segments from all of the microphones, the processor being operative to determine the distance from the area of interest to the respective microphones and to set the volume for the respective sound segments in relation thereto.

12. A system for playing selected audio segments associated with a particular image, the system comprising:

a memory in which there is stored at least one image and a plurality of audio segments corresponding with each stored image;

a display upon which the image may be displayed;

a processor connected to the memory and to the display, said processor being adapted to retrieve the image and display the image on the display;

a user interface connected to the processor which allows a user to select an area of interest on the image; and the processor being operative to sense the selected area of interest and to retrieve from the memory the audio segments from one or more of the sources based upon the selected area of interest.

13. The system of claim 12 and further including a scanner which can scan printed images and create a digital bit-map representations of the images and wherein:

the processor is connected to the scanner so as to receive the digital bit-map representations and store the representations in the memory.

14. The system of claim 12 wherein the user interface comprises at least one of a touch screen, mouse, light pen, and keyboard.

15. The system of claim 13 wherein the display, processor, scanner, and sound playback device are embodied in a computer.

16. The system of claim 12 wherein:

the audio segments are recorded by plural microphones; and the processor assigns coordinate locations of the display to each microphone and is programmed to select the audio segments based upon the distance from the area of interest to the coordinate locations for each microphone.

17. The system of claim 12 wherein:

the audio segments are recorded by plural microphones; and the processor assigns coordinate locations of the display to each microphone and is responsive to the area of interest selected to play sound segments from a plurality of the microphones and to play the sound segment from the microphone closest to the area of interest at a preselected volume.

18. The system of claim 12 wherein:

the audio segments are recorded by plural microphones; and the processor assigns coordinate locations of the display to each microphone and is responsive to the area of interest selected to blend the sound segments from all of the microphones, the processor being operative to determine the distance from the area of interest to the respective microphones and to set the volume for the respective sound segments in response thereto.

19. A method for reproducing an audio signal from printed, encoded sound data associated with a printed image, comprising the steps of:

scanning the printed sound data with a conventional scanner;

decoding the scanned sound data;

converting the decoded sound data to an audio signal; and playing the audio signal.

20. The method of claim 19 wherein the step of scanning includes using a reflection scanner.

21. The method of claim 19 wherein the sound data is recorded by plural sources, and further including the step of parsing the scanned data based on the recording source.

22. The method of claim 19 wherein the sound data includes a start sentinel and further including the step of searching for the start sentinel.

23. The method of claim 19 wherein the step of decoding includes performing a bit map data extraction routine.

24. The method of claim 19 and further including the step of storing the converted audio signal in memory.

25. A method for capturing and reproducing at least one audio signal, the audio signal being associated with a visual image, the method comprising the steps of:

recording a visual image on film;

recording at least one audio signal;

optically encoding the recorded audio signal;

writing the optically encoded signal on the film;

creating a print of the image and encoded signal;

scanning the encoded signal;

decoding the encoded signal;

converting the decoded signal to an audio signal; and playing the audio signal.

26. The method of claim 25 wherein the step of scanning includes using a reflection scanner.

27. The method of claim 25 wherein:

the step of recording at least one audio signal involves recording sound data from plural sources; and the step of converting includes the step of parsing the scanned data based on the source.

28. The method of claim 25 wherein the sound data includes a start sentinel and the step of scanning includes searching for the start sentinel.

29. The method of claim 25 wherein the step of decoding includes the step of performing a bit map data extraction routine.

30. The method of claim 25 and further including the step of storing the converted audio signal in memory.

31. The method of claim 25 wherein the step of creating the print utilizes an optical printer.

32. The method of claim 25 wherein the step of creating the print utilizes a CRT printer.

33. The method of claim 25 wherein the step of recording at least one audio signal comprises recording plural audio signals from plural microphones for each image.

34. A system for capturing and reproducing at least one audio signal, the audio signal being associated with a visual image, the system comprising:

a camera for recording a visual image on film and for recording one or more audio signals associated with the visual image, the camera further including an optical encoder device for optically encoding the recorded audio signal, and an optical write head electrically connected to the optical encoder device for imprinting the encoded audio signal on the film;

a printer for creating a print of the visual image and encoded audio signal;

a scanner for scanning the print and generating scanned data;

circuitry connected to the scanner for receiving the scanned data and for decoding the data, said circuitry converting the decoded data to create a converted audio signal; and a sound playback unit connected to the circuitry for receiving the converted audio signal and for playing the audio signal.

35. The system of claim 34 wherein the printer comprises an optical printer.

36. The system of claim 34 wherein the printer comprises a CRT printer.

37. The system of claim 34 wherein the camera includes plural microphones for recording plural audio segments associated with each captured image.

38. The system of claim 34 wherein the circuitry is programmed to decode the scanned data by using a bit map extraction routine.

* * * * *